(12) United States Patent
Oku

(10) Patent No.: US 6,827,114 B2
(45) Date of Patent: Dec. 7, 2004

(54) METHOD OF MANUFACTURING PNEUMATIC TIRE

(75) Inventor: Masahiro Oku, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 148 days.

(21) Appl. No.: 10/011,285

(22) Filed: Dec. 11, 2001

(65) Prior Publication Data

US 2002/0121324 A1 Sep. 5, 2002

(30) Foreign Application Priority Data

Dec. 12, 2000 (JP) ........................................ 2000-377662

(51) Int. Cl.$^7$ .............................. B60C 9/18; B29D 30/70
(52) U.S. Cl. ....................... 152/197; 152/200; 152/202; 152/526; 152/533; 152/DIG. 14; 156/117; 156/130; 156/133
(58) Field of Search ................................ 156/117, 133, 156/123, 130, 173, 180, 906; 152/526, 563, 543, 533, 451, DIG. 14, 196, 197, 198, 200, 201, 202

(56) References Cited

U.S. PATENT DOCUMENTS

| | | | |
|---|---|---|---|
| 974,855 A | * | 11/1910 | Bousquet .................... 152/563 |
| 2,031,720 A | * | 2/1936 | Lee et al. .................... 152/563 |
| 3,024,828 A | | 3/1962 | Smith et al. |
| 3,721,599 A | | 3/1973 | Addis |
| 3,785,423 A | | 1/1974 | De Carbon |
| 3,972,767 A | | 8/1976 | Frazier |
| 4,302,265 A | * | 11/1981 | Cesar et al. ................. 156/117 |
| 4,325,999 A | | 4/1982 | Campman et al. |
| 4,745,957 A | | 5/1988 | Sumner |
| 4,838,966 A | * | 6/1989 | Oswald ....................... 156/117 |
| 5,505,802 A | | 4/1996 | Debroche et al. |

FOREIGN PATENT DOCUMENTS

DE                 655 270             1/1938

* cited by examiner

Primary Examiner—Geoffrey L. Knable
(74) Attorney, Agent, or Firm—Birch, Stewart, Kolasch & Birch, LLP

(57) ABSTRACT

A method of manufacturing a pneumatic tire comprises making a rubber-coated cord-member by coating one or more cords with rubber, and making the tread reinforcement by putting together a plurality of the cord-members around a drum into a cylindrical network of the cords, so that the cords make a first array of cords inclining in one direction with respect to the tire equator and a second array of cords inclining in one direction which is opposite to the cords of the first array with respect to the tire equator.

It is possible that the cord-members are woven. It is also possible that the cord-members are not woven and, in the crossings of the cords, one of the two cross cords is curved along the other cord.

12 Claims, 5 Drawing Sheets

METHOD OF MANUFACTURING PNEUMATIC TIRE

The present invention relates to a method of manufacturing a pneumatic tire more particularly to a method of making a tread reinforcement being capable of reducing the tire weight.

In general, radial tires are provided in the tread portion with a breaker to reinforce the tread portion. Further, in case of high speed use especially, a band is disposed on the radially outside of the breaker.

The breaker comprises two cross plies of parallel cords, wherein the plies are disposed one upon another so that the cords of one ply are crosswise to the other ply.

Conventionally, such a breaker is made such that first a strip of rubberized unwoven cord fabric is wound and, then another strip of rubberized unwoven cord fabric whose cord inclination is crosswise is wound on the former winding. As shown in FIG. 7, each strip has a constant width La and a length more than the circumferential length of the breaker, and the circumferential ends of each strip is spliced as shown in FIG. 8. Thus, the breaker has at least two splices.

As the spliced portion becomes thicker, the tire uniformity and conicity deteriorate, and as a result, steering stability, ride comfort and the like tend to deteriorate. Usually, the coating thickness (t) of the topping rubber (g) is set in a range of more than about 0.5 mm to be able to handle the strip as a continuous sheet. Thus, in the portion other than the spliced portions, the total thickness (t0) of two cross breaker plies becomes equal to the thickness of the cord× 2+the coating thickness (t)×4 in rough, as shown in FIG. 9. This makes it difficult to reduce the tire weight.

The laid-open Japanese patent application JP-A-5-16610, discloses the use of a strip of two-axial woven cord fabric in stead of the above-mentioned two cross plies of rubberized unwoven cord fabric. In this case, a cord spacing corresponding to the cord spacing (d) of the conventional breaker becomes zero and the total thickness of the breaker may be reduced accordingly. But, as the cords substantially contact each other in their crossings, they are rubbed against each other by the pantograph phenomenon accompanying the tread deformation during running, and thus the durability tends to decrease.

It is therefore, an object of the present invention to provide a pneumatic tire in which the tire weight is effectively reduced by reducing the weight of the tread reinforcing structure, and the damage on the cords by rubbing is prevented to improve the durability, and further the uniformity, steering stability, ride comfort and the like are improved.

According to the present invention, a method of manufacturing a pneumatic tire comprises
making a rubber-coated cord-member by coating one or more cords with rubber, and
making a tread reinforcement by putting together a plurality of the cord-members around a drum into a cylindrical network of the cords, which cords make a first array of cords inclining in one direction with respect to the tire equator and a second array of cords inclining in one direction which is opposite to the cords of the first array with respect to the tire equator.

Embodiments of the present invention will now be described in detail in conjunction with the accompanying drawings.

Figure 1:
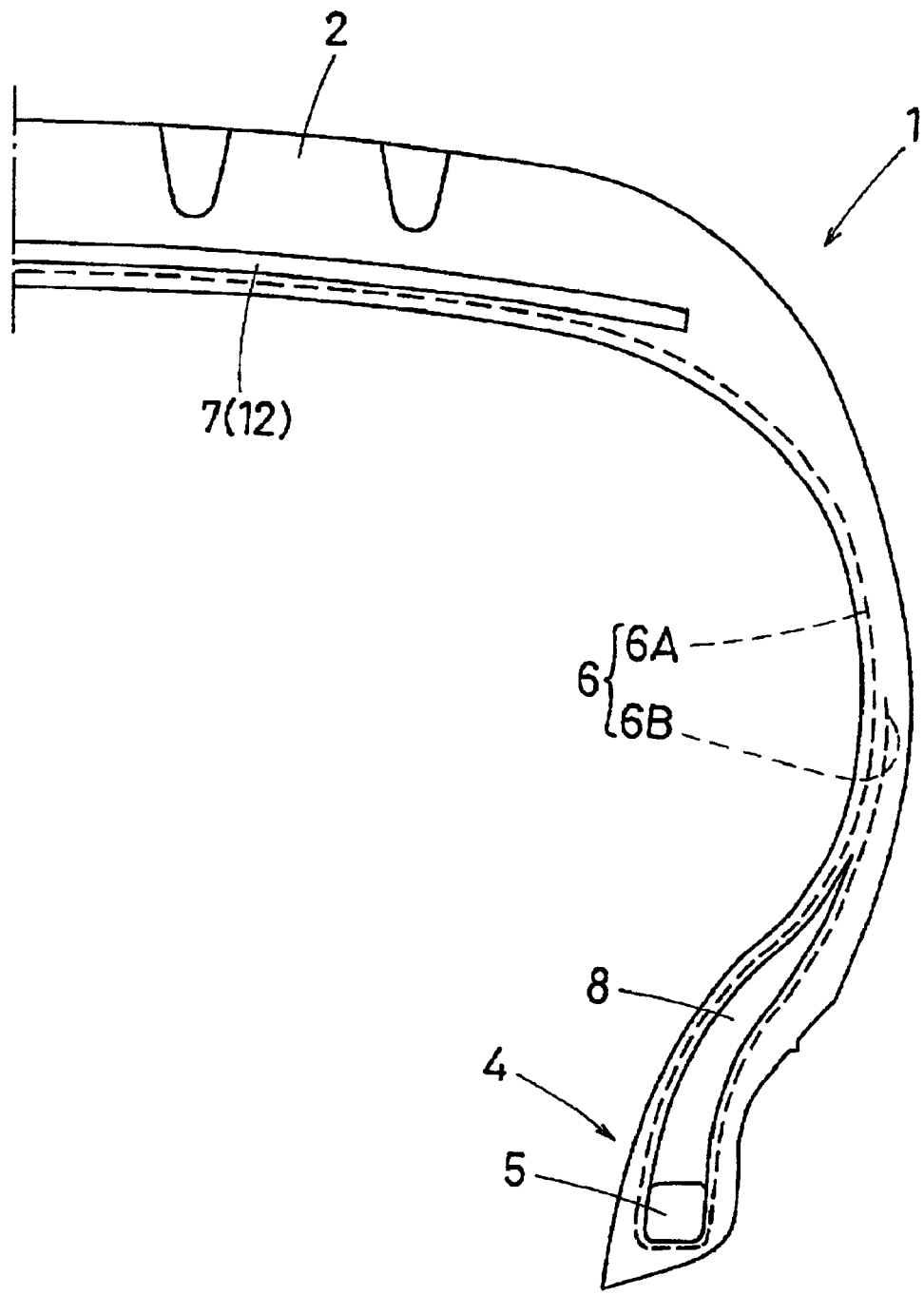
FIG. 1 is a sectional view of a pneumatic tire which can be manufactured by a method according to the present invention.

A pneumatic tire 1 has a tread portion 2, a pair of sidewall portions 3 and a pair of bead portions. 4 The tire 1 is provided with a carcass 6 extending between the bead portions 4 and a stiff tread reinforcement 7 disposed radially outside the carcass 6 in the tread portion 2.

The carcass 6 comprises at least one ply of cords arranged radially at an angle of from 70 to 90 degrees with respect to the tire equator, extending between the bead portions 4 through the tread portion 2 and sidewall portions 3 and turned up around the bead core 5 in each bead portion 4 from the inside to the outside of the tire so as to form a pair of carcass turnups 6B and a carcass main 6A therebetween. Between the carcass main 6A and each turnup 6B, a bead-apex rubber 8 extending radially outwards from the bead core 5 is disposed to reinforce the bead portion 4. For the carcass cords, organic fiber cords, e.g. nylon, polyester, rayon and aromatic polyamide, are suitably used.

The tread reinforcement 7 is made of a cylindrical endless cord-network 12.

The cord-network 12 is composed of a first array 21 of cords 10 which are inclined to one direction with respect to the tire equator (hereinafter the "first cords 11A"), and a second array 22 of cords 10 which are inclined to one direction with respect to the tire equator which is opposed to that of the first array 21 (hereinafter the second cords 11B"). The inclination angle (alpha1) of the first cords 11A and the inclination angle (alpha2) of the second cords 11B are the same absolute value in a range of from 10 to 35 degrees with respect to the tire equator, but the inclinations are opposite with respect to the tire equator.

The cylindrical cord-network 12 is made using a drum D, namely, a single cord 10 coated with rubber G (hereinafter the "single cord") or a plurality of (2 to 11) cords 10 embedded in rubber G are applied to the surface of the drum D. The surface of the drum D may be cylindrical but usually and preferably it is profiled into a specific shape similar to that in the finished tire. The coating rubber G is vulcanized or half-vulcanized.

Figure 2:
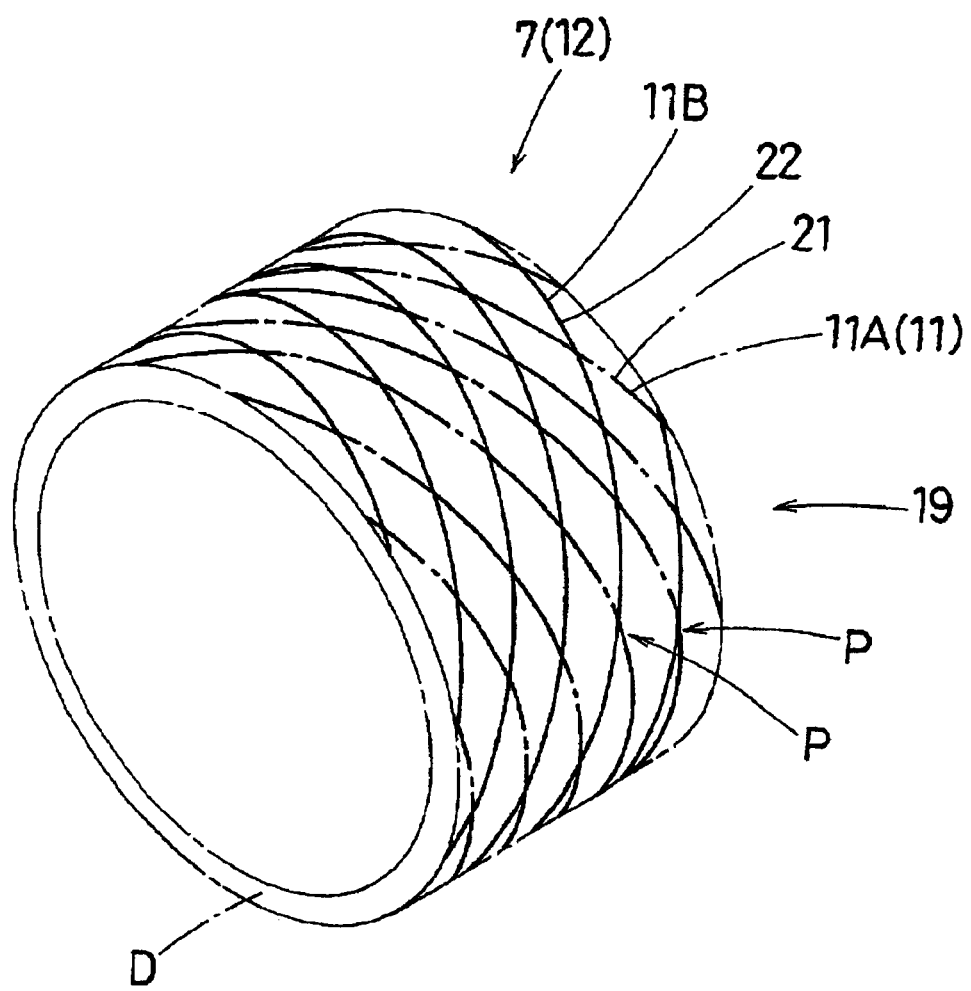
FIG. 2 is a schematic perspective view of a cylindrical cord-network for the tread reinforcement.
Figure 3:
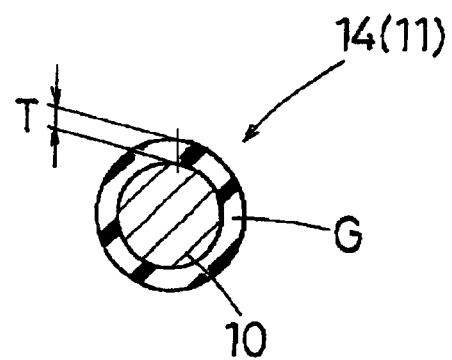
FIG. 3 is sectional views of a rubber-coated cord for making the tread reinforcement.
Figure 4:
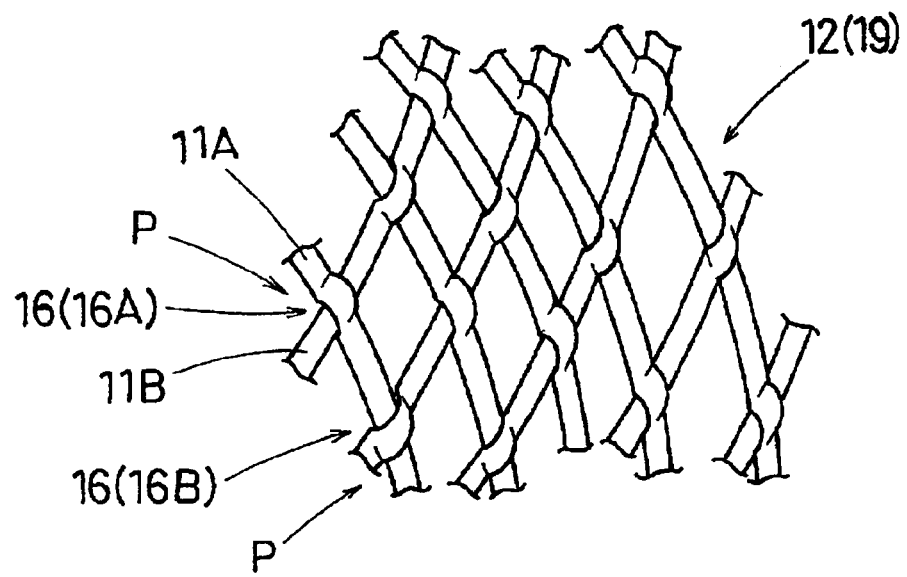
FIG. 4 is an enlarged perspective view showing an example of the cylindrical cord-network.

In this embodiment, the cylindrical cord-network 12 is formed by weaving the single cords 10 into a continuous annular net as shown in FIG. 2, wherein the cords which cross any of the cords alternate between the outside and inside of the crossed cord along the length thereof as shown in FIG. 4.

In the crossings P between the first cords 11A and the second cords 11B, in order to prevent direct contact between the first cords 11A and second cords 11B, the thickness T of the coating rubber G must be set in a range of from 0.10 to 0.40 mm, more preferably 0.15 to 0.30 mm. If the thickness T is less than 0.10 mm, the cord damage can not be prevented. If the thickness T is more than 0.40 mm, it becomes impossible to attain a thickness reduction of the tread reinforcement 7.

In the crossings P, the thickness of the cord-network is doubled, but in the other portion, the first cords 11A and second cords 11B are on the same plane. Therefore, the thickness of the cord-network corresponds to the thickness of the cords inclusive of the rubber G.

In the cord-network 12, steel cords or high modulus organic fiber cords such as aromatic polyamide are preferably used. In this example, steel cords are used.

In case of passenger car tires, the cord density of the tread reinforcement 7 is determined as follows. with respect to each of the cord arrays 21 or 22, the total cross-section area in sq.mm of the cords 10 which are disposed in a unit width of 50 mm (perpendicularly to the cord direction) is in a range of from 5.0 to 12.0. The total cross-section area may be obtained by multiplying the cord count per 50 mm width and the cross-sectional area in sq.mm of a cord. By employing the cord-network, it becomes possible to reduce the total cross-section area in a range of from 2.5 to 8.0 smaller than the conventional breaker.

It is desirable to half-vulcanize the cylindrical cord-network 12 on the drum to provide a self-shape-retaining power. To perform such half-vulcanization, a direct heating, magnetic induction heating or the like may be used.

Figure 5:
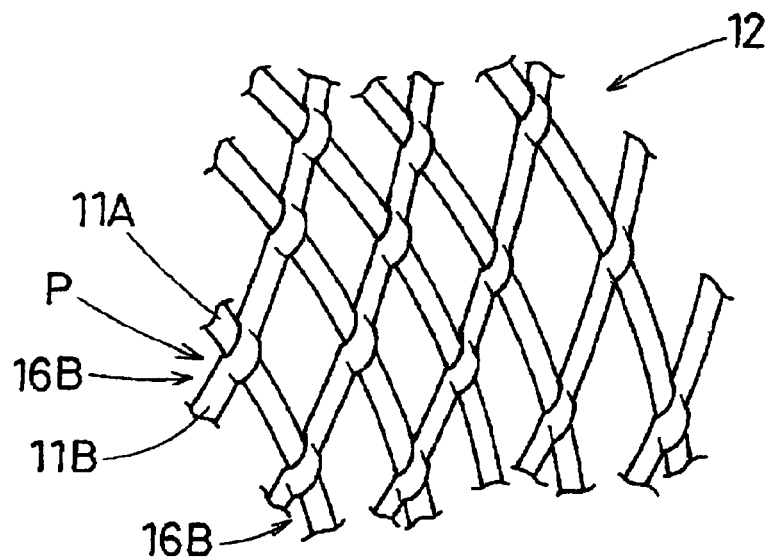
FIG. 5 is an enlarged perspective view showing another example of the cylindrical cord-network.
Figure 7:
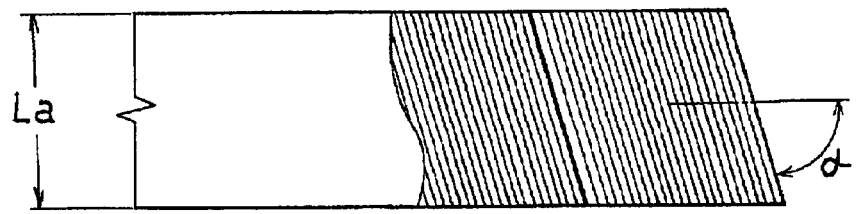
FIG. 7 is a plan view of a strip of rubberized unwoven cord fabric for making the conventional breaker.
Figure 8:
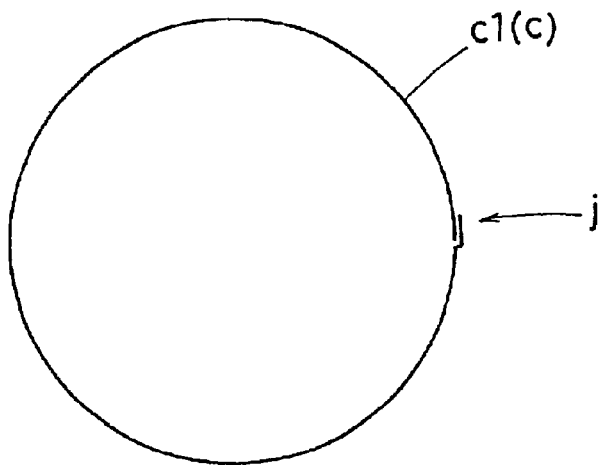
FIG. 8 shows the strip of rubberized unwoven cord fabric which is wound and spliced.
Figure 9:
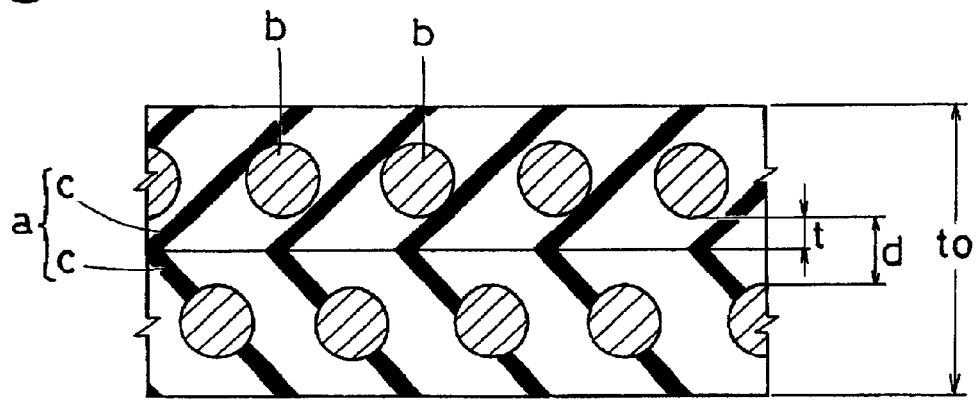
FIG. 9 is an enlarged sectional view of the conventional breaker.

FIG. 5 shows another example of the cylindrical cord-network 12. In this example, unlike the former example, the second cord array 22 is disposed on the first cord array 21, without weaving the cords. But, in the portion other than the crossings P, the cords 11A of the first array 21 and the cords 11B of the second array 22 are on the same plane. Thus, in the crossings P, the cords are curved to bind each other similar to the former example. In this example, the cylindrical cord-network 12 is formed as follows. First, the above-mentioned single cords are applied on the drum D side-by-side while inclining at the inclination angle (alpha1) to make the first array 21 of cords 11A. Then, on the first array 21 around the drum D, in order to make the second cord array 22, the single cords are applied side-by-side while inclining at the inclination angle (alpha2). Therefore, as shown in FIG. 5, the cords which cross any of the cords are either the outside or the inside of the crossed cord along the length thereof unlike the former example shown in FIG. 4.

Therefore, the cord-networks 12 shown in FIGS. 4 and 5 have no joint unlike the conventional breaker having two splices.

Accordingly, the tire uniformity and conicity are improved, and the ride comfort may be improved. In the example shown in FIG. 5 and the former example shown in FIG. 4, in making the cord-network 12, the first cords 11A and the second cords 11B are pressed between the drum D and an elastic roller to place them on the same plane. AS the first and the second cords 11A and 11B are engaged with each other by their curved portions in the crossings P which are exaggeratedly shown in FIGS. 4 and 5, the rigidity and hoop effect are increased, and the steering stability can be effectively improved. Further, by the engagement of the cords, the stress on the cords is dispersed to improve the high-speed durability. As a result, it becomes not necessary to dispose a conventional band on the radially outside of the cord-network 12, and a further weight reduction is possible. As the cords 11A and 11B are on the same plane in a substantial part of the cord-network 12, the residual cornering force becomes zero. Owing to this effect, one-side drifting of the vehicle can be prevented and the steering stability is improved. Unlike the conventional breaker, a tread rubber 2G enters the meshes of the cord-network 12.

Therefore, the rigidity of the tread portion 2 is improved, and the resistance to separation therebetween is increased.

Figure 6:
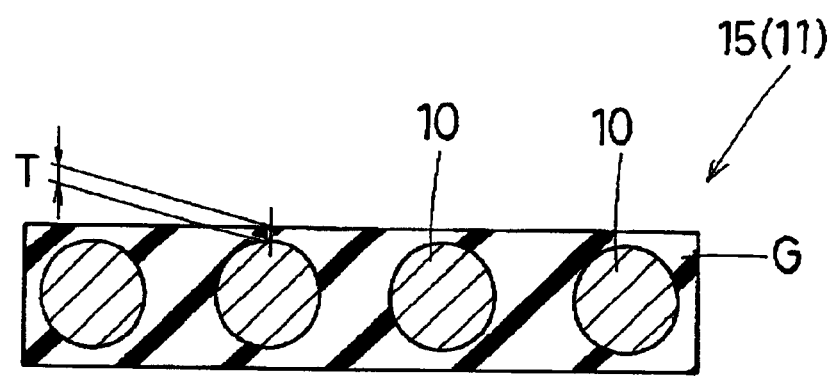
FIG. 6 is sectional views of rubber-coated cords gathered into a tape for making the tread reinforcement.

In the above description, the single cords are used to make the cord-network 12. But, a plurality of tapes may be used instead of the single cords, wherein, a plurality (2 to 11) of cords 10 are embedded in the rubber G in a form of a tape as shown in FIG. 6. The use of the tapes is preferable for the working efficiency.

In order to rubber-coat a single cord or plurality cords, such a method that a cord or cords passing through the nozzle of a rubber extruder is drawn together with rubber.

After the cylindrical cord-network 12 is formed on the drum D, the tread rubber 2G is applied to the outside of the cylindrical cord-network 12 while being pressed against the cylindrical cord-network 12 to thereby make an annular assembly of the tread rubber 2G and tread reinforcement 7.

on the other hand, using a tire building drum, a main body of the tire is formed. An inner liner or a thin sheet of air-impermeable rubber is wound around a tire building drum. To make the carcass ply, a strip of rubberized unwoven cord fabric is wound thereon. On the outside of the cylindrically wound carcass, the bead cores 5 and bead apexes 8 are placed. The edges of the carcass are folded back around the bead cores and the carcass is changed from the cylindrical shape to a toroidal shape while timely applying rubber components such as sidewall rubber and bead rubber called clinch rubber and reinforcing cord layer if any. Then, around this toroidal tire main body, the above-mentioned tread rubber and reinforcement assembly is put. The green tire made like this is put into a mold and heated to be vulcanized.

Comparison Tests

Radial tires of size 165SR13 (rim size 13×4.5) were made and tested for the one-side-drifting, durability and high-speed tire durability. Test results and the specification of the tread reinforcements (conventional breaker) are shown in Table 1.

One-side-drifting Test:

A Japanese 1600 cc FF car provided on all the wheels with test tires was run straight for 100 meters without holding the steering wheel, and the displacement of the car was measured. The average value of five time measurements is indicated in Table 1 by an index based on the conventional tire being 100. The smaller the index number, the smaller the displacement.

Durability Test:

The test car made 8-turn (radius 20 m) a hundred times and then breaks of the cords were counted. The count is indicated in Table 1 by an index based on the conventional tire being 100. The larger the index number, the higher the durability.

High-speed Tire Durability Test:

The test was conducted using a tire test drum according to the ECE30 standard. The running speed of the test tire was increased every 20 minutes at steps of 10 km/h from 170 km/hr. The running was continued until the tire was broken. In Table 1, there is shown a speed which is one step lower than the speed at which the tire was broken. (Inflation pressure: 265 Kpa, Tire load: 380 kgf/sq.cm)

Weight:

The weight of the cord-network and the breaker consisting of two cross plies were measured and indicated by an index based on the breaker being 100.

TABLE 1

| Tire | conv. | Ex. 1 | Ex. 2 |
|---|---|---|---|
| Tread reinforcement | | | |
| Cord network | — | FIG. 4 | FIG. 5 |
| Breaker | 2 plies | — | — |
| Cord material | steel | steel | steel |
| Cord angle (deg.) | +22/−22 | +22/−22 | +22/−22 |
| Rubber Coat thickness (mm) | 0.35 | 0.2 | 0.2 |
| Cord count/50 mm | 40 | 24 | 24 |
| weight | 100 | 60 | 60 |
| One-side-drifting | 100 | 60 | 60 |
| Durability | 100 | 130 | 120 |
| High-speed durability (km/hr) | 200 | 220 | 210 |

From the test results, it was confirmed that the weight can be greatly decreased, while improving the one-side-drifting, durability and high-speed durability.

What is claimed is:

1. In a method of manufacturing a pneumatic tire provided in the tread portion with a tread reinforcement, the improvement comprising making a rubber-coated cord-member by coating one or more cords with rubber, making the tread reinforcement by putting together a plurality of the cord-members around a drum into a cylindrical network of the cords, which cords make a first array of cords inclining in one direction with respect to the tire equator and a second array of cords inclining in one direction which is opposite to the cords of the first array with respect to the tire equator, and pressing the cylindrical network of the cords against the drum with an elastic material so that:

in each of the crossings of the cords, one of the two cross cords curves along the other; and in the portion other than the crossings, the cords of the first array and the cords of the second array are on the same plane.

2. A method of manufacturing a pneumatic tire according to claim 1, wherein in the process of putting together a plurality of the cord-members, the cord-members are woven.

3. A method of manufacturing a pneumatic tire according to claim 1, wherein in the process of putting together a plurality of the cord-members, the cord-members are not woven, and this process includes putting cord-members around the drum to make the first array, and putting cord-members on the first array around the drum to make the second array.

4. A method of manufacturing a pneumatic tire according to claim 1, wherein said rubber-coated cord-member is a rubber-coated single cord, and in the process of putting together a plurality of the cord-members, the cord-members are woven.

5. A method of manufacturing a pneumatic tire according to claim 1, wherein said rubber-coated cord-member is a rubber-coated single cord, and in the process of putting together a plurality of the cord-members, the cord-members are not woven, and this process includes putting cord-members around the drum to make the first array, and putting cord-members on the first array around the drum to make the second array.

6. A pneumatic tire manufactured by the method according to any of the preceding claims.

7. A pneumatic tire comprising a carcass extending between bead portions through a tread portion and sidewall portions, and a tread reinforcement disposed radially outside the carcass in the tread portion, said tread reinforcement comprising a cylindrical endless cord-network, the cord-network composed of a first array of cords inclined to one direction with respect to the tire equator, and a second array of cords inclined to one direction with respect to the tire equator which is opposed to that of the first array, in each of crossings of the cords of the first array and the cords of the second array, one of the two cross cords curves along the other, and in the other portion than the crossings, and cords of the first array and the cords of the second array are on the same plane.

8. A pneumatic tire according to claim 7, wherein the cords of the first array and the cords of the second array are woven.

9. A pneumatic tire according to claim 7, wherein the cords of the first array and the cords of the second array are not woven and one of the arrays is disposed on the other.

10. A pneumatic tire according to claim 7, wherein said tread reinforcement consists of said cylindrical endless cord-network.

11. A pneumatic tire according to claim 8, wherein said tread reinforcement consists of said cylindrical endless cord-network.

12. A pneumatic tire according to claim 9, wherein said tread reinforcement consists of said cylindrical endless cord-network.

* * * * *